United States Patent
Yuge

(10) Patent No.: US 11,313,589 B2
(45) Date of Patent: Apr. 26, 2022

(54) TANKLESS WATER HEATER WITH BYPASS VALVE OPERATING DIFFERENTLY IN INTERMITTENT OPERATION AND NORMAL OPERATION

(71) Applicant: RINNAI CORPORATION, Nagoya (JP)

(72) Inventor: Rikiya Yuge, Nagoya (JP)

(73) Assignee: RINNAI CORPORATION, Nagoya (JP)

(*) Notice: Subject to any disclaimer, the term of this patent is extended or adjusted under 35 U.S.C. 154(b) by 0 days.

(21) Appl. No.: 16/997,056

(22) Filed: Aug. 19, 2020

(65) Prior Publication Data
US 2021/0063054 A1  Mar. 4, 2021

(30) Foreign Application Priority Data

Aug. 26, 2019  (JP) .............................. JP2019-154108

(51) Int. Cl.
| | |
|---|---|
| *F24H 9/20* | (2022.01) |
| *G05D 11/16* | (2006.01) |
| *F24H 1/10* | (2022.01) |

(52) U.S. Cl.
CPC ............. *F24H 9/2035* (2013.01); *F24H 1/10* (2013.01); *F24H 1/107* (2013.01); *F24H 9/2007* (2013.01); *G05D 11/16* (2013.01); *F23N 2225/18* (2020.01); *F23N 2225/19* (2020.01); *F23N 2225/21* (2020.01); *F24D 2220/042* (2013.01); *F24D 2220/044* (2013.01); *Y10T 137/6497* (2015.04)

(58) Field of Classification Search
CPC ........ F24H 1/10; F24H 9/2028; F24H 9/2035; F23N 2225/18; F23N 2225/19; F23N 2225/21; F24D 2220/042; F24D 2220/044; Y10T 137/6497; G05D 11/16
USPC ....................................................... 122/14.3
See application file for complete search history.

(56) References Cited

U.S. PATENT DOCUMENTS

| | | | | |
|---|---|---|---|---|
| 2008/0022946 A1* | 1/2008 | Inami | ...................... | F24D 12/02 |
| | | | | 122/14.21 |
| 2012/0046801 A1* | 2/2012 | Mori | ....................... | F24H 1/145 |
| | | | | 700/300 |

FOREIGN PATENT DOCUMENTS

| | | | | |
|---|---|---|---|---|
| JP | 2007093098 A | * | 4/2007 | |
| JP | 2018100810 A | * | 6/2018 | |
| JP | 2018100810 A |   | 6/2018 | |
| JP | 202070978 A |   | 5/2020 | |

* cited by examiner

*Primary Examiner* — Nathaniel Herzfeld
(74) *Attorney, Agent, or Firm* — K&L Gates

(57) ABSTRACT

The water heater may be configured to execute a normal operation in which a heating means is continuously operated in an ON state in a case where a required heat quantity is greater than or equal to a minimum heat quantity. The water heater may be configured to execute an intermittent operation in which the heating means is alternately and repeatedly operated in the ON state and an OFF state repeatedly in a case where the required heat quantity is less than the minimum heat quantity. The water heater may be configured to change a distribution ratio of a flow control mechanism in the normal operation and in the intermittent operation. An operating speed of the flow control mechanism in the intermittent operation may be faster than an operating speed of the flow control mechanism in the normal operation.

2 Claims, 3 Drawing Sheets

TANKLESS WATER HEATER WITH BYPASS VALVE OPERATING DIFFERENTLY IN INTERMITTENT OPERATION AND NORMAL OPERATION

CROSS-REFERENCE TO RELATED APPLICATION

This application claims priority to Japanese Patent Application No. 2019-154108, filed on Aug. 26, 2019, the entire contents of which are hereby incorporated by reference into the present application.

TECHNICAL FIELD

The technology herein disclosed relates to a water heater.

BACKGROUND ART

A water heater in Japanese Patent Application Publication No. 2018-100810 includes: a heat exchanger; a heating member configured to heat the heat exchanger; a water line connecting a water supply site to an inlet of the heat exchanger; a hot water line connecting an outlet of the heat exchanger to a hot water supply site; a bypass line connecting the water line to the hot water line without going through the heat exchanger; a supplied water temperature sensor arranged on the water line and configured to detect a supplied water temperature which is a temperature of water supplied to the water line; a supplied hot-water temperature sensor arranged on the hot water line and configured to detect a supplied hot-water temperature which is a temperature of water supplied to the hot water supply site, wherein the supplied hot-water temperature sensor is arranged downstream of a connection between the hot water line and the bypass line; a flow control mechanism configured to adjust a distribution ratio which is a ratio of a second flow rate to a first flow rate, wherein the first flow rate is a flow rate of water flowing from the water line to the heat exchanger, and the second flow rate is a flow rate of water flowing from the water line to the bypass line; and a controller. The controller is configured to: calculate a required heat quantity; determine whether or not the required heat quantity is less than a minimum heat quantity of the heat exchanger; in a case where the required heat quantity is greater than or equal to the minimum heat quantity, execute a normal operation in which the heating member is continuously operated in an ON state; and in a case where the required heat quantity is less than the minimum heat quantity, execute an intermittent operation in which the heating member is alternately and repeatedly operated in the ON state and an OFF state. The controller is configured to change the distribution ratio of the flow control mechanism in the normal operation and in the intermittent operation.

SUMMARY

The water heater in Japanese Patent Application Publication No. 2018-100810 does not consider an operating speed of the flow control mechanism in each of the normal operation and the intermittent operation. In the intermittent operation, the heating member is alternately and repeatedly operated in the ON state and the OFF state, and hence the heat quantity of the heating member, which is configured to heat the heat exchanger, greatly varies in comparison with the case where the heating member is continuously operated in the ON state. The supplied hot-water temperature in the intermittent operation therefore varies more greatly than the supplied hot-water temperature in the normal operation. A technology that can reduce variations in the supplied hot-water temperature in the intermittent operation is desired.

The present disclosure provides a technology that can reduce variations in a supplied hot-water temperature in an intermittent operation.

A water heater disclosed herein may comprise: a heat exchanger; a heating member configured to heat the heat exchanger; a water line connecting a water supply site to an inlet of the heat exchanger; a hot water line connecting an outlet of the heat exchanger to a hot water supply site; a bypass line connecting the water line to the hot water line without going through the heat exchanger; a supplied water temperature sensor arranged on the water line and configured to detect a supplied water temperature which is a temperature of water supplied to the water line; a supplied hot-water temperature sensor arranged on the hot water line and configured to detect a supplied hot-water temperature which is a temperature of water supplied to the hot water supply site, the supplied hot-water temperature sensor being arranged downstream of a connection between the hot water line and the bypass line; a flow control mechanism configured to adjust a distribution ratio which is a ratio of a second flow rate to a first flow rate, the first flow rate being a flow rate of water flowing from the water line to the heat exchanger, and the second flow rate being a flow rate of water flowing from the water line to the bypass line; and a controller, wherein the controller is configured to: calculate a required heat quantity based on a supplied hot-water target temperature which is a target temperature of water supplied to the hot water supply site; determine whether or not the required heat quantity is less than a minimum heat quantity of the heat exchanger; in a case where the required heat quantity is greater than or equal to the minimum heat quantity, execute a normal operation in which the heating member is continuously operated in an ON state; in a case where the required heat quantity is less than the minimum heat quantity, execute an intermittent operation in which the heating member is alternately and repeatedly operated in the ON state and an OFF state; and change the distribution ratio of the flow control mechanism based on the supplied water temperature, the supplied hot-water temperature, and the supplied hot-water target temperature in the normal operation and in the intermittent operation, wherein an operating speed of the flow control mechanism in the intermittent operation is faster than an operating speed of the flow control mechanism in the normal operation.

According to the above-described configuration, the operating speed of the flow control mechanism in the intermittent operation is fast, so that the distribution ratio is quickly changed. Therefore, even if the heat quantity of the heating member, which is configured to heat the heat exchanger, greatly varies in the intermittent operation, the quick change in the distribution ratio can quickly bring the supplied hot-water temperature close to the supplied hot-water target temperature. Variations in the supplied hot-water temperature in the intermittent operation can therefore be suppressed.

EMBODIMENTS

Figure 1:
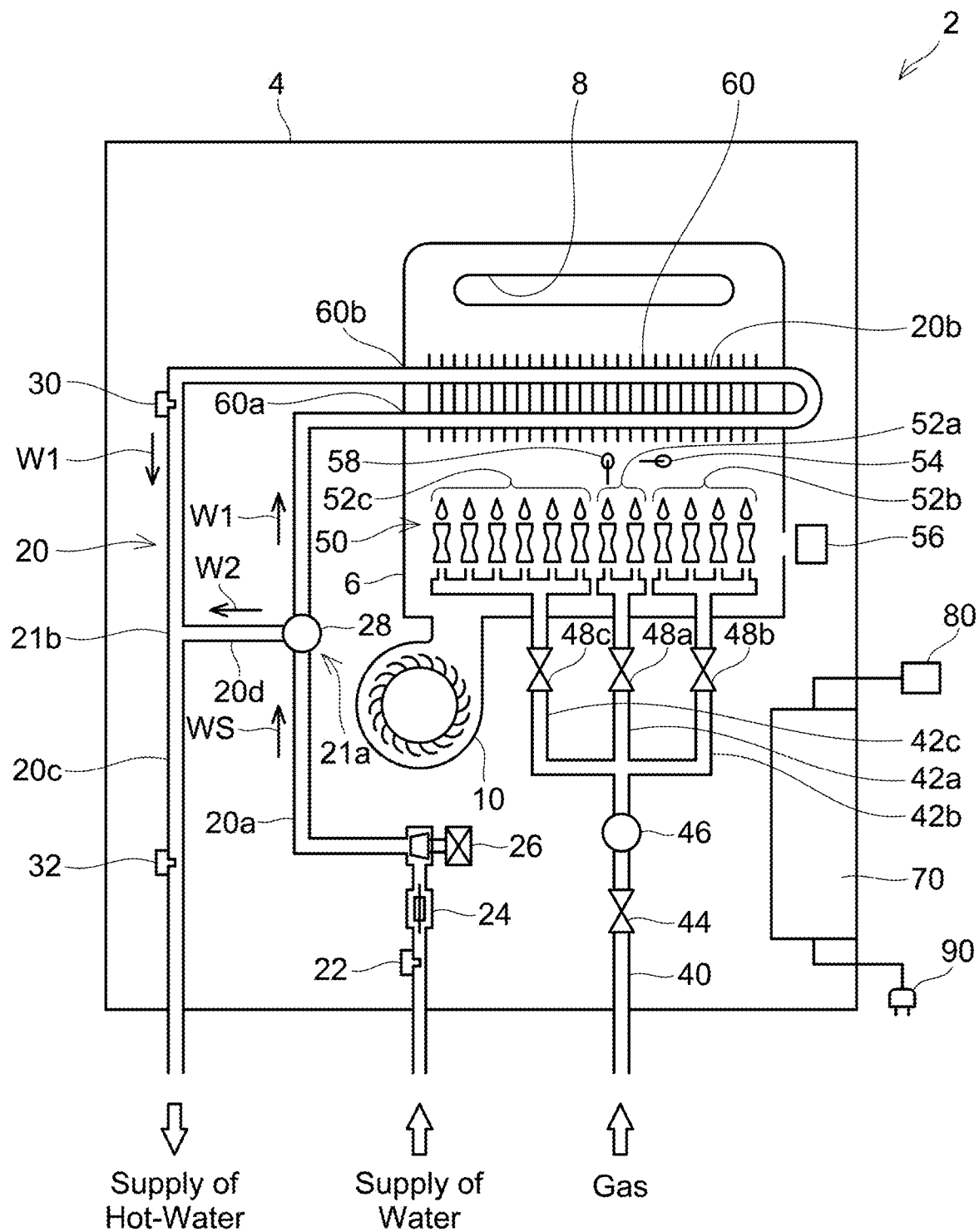
FIG. 1 is a diagram showing a configuration of a water heater 2 according to a present embodiment.

In one or more embodiments, the water heater may further comprise a discharged hot-water temperature sensor arranged on the hot water line and configured to detect a discharged hot-water temperature which is a temperature of water discharged to the hot water line from the heat exchanger, the discharged hot-water temperature sensor being arranged upstream of the connection between the hot water line and the bypass line. The flow control mechanism may be operable within a range where the distribution ratio is less than or equal to a predetermined ratio. The controller may be further configured to: in the case where the required heat quantity is less than the minimum heat quantity, decide a specific distribution ratio using a predetermined first discharged hot-water target temperature, the supplied water temperature, and the supplied hot-water target temperature, the specific distribution ratio being a distribution ratio required for achieving the supplied hot-water target temperature; determine whether or not the specific distribution ratio is greater than the predetermined ratio; and in a case where the specific distribution ratio is less than or equal to the predetermined ratio, execute the intermittent operation using the discharged hot-water temperature and the first discharged hot-water target temperature, wherein in a case where the specific distribution ratio is greater than the predetermined ratio, a second discharged hot-water target temperature is decided by using the supplied water temperature, the supplied hot-water target temperature, and the predetermined ratio, and the intermittent operation using the discharged hot-water temperature and the second discharged hot-water target temperature is executed.

The specific distribution ratio is a distribution ratio suitable for a case where the intermittent operation using the discharged hot-water temperature and the first discharged hot-water target temperature is executed. Therefore, if the flow control mechanism can be operated at the specific distribution ratio, water heated to the supplied hot-water target temperature can be supplied to the hot water supply site even when the intermittent operation using the discharged hot-water temperature and the first discharged hot-water target temperature is executed. The flow control mechanism is, however, operable within the range where the distribution ratio is less than or equal to the predetermined ratio. Thus, even when the specific distribution ratio is greater than the predetermined ratio, the distribution ratio of the flow control mechanism cannot be set greater than the predetermined ratio. Operating the flow control mechanism at the predetermined ratio when the specific distribution ratio is greater than the predetermined ratio would cause more water to be supplied to the heat exchanger than it should be. In this case, the heat quantity provided by the heat exchanger increases, so that water having a temperature higher than the supplied hot-water target temperature could be supplied to the hot water supply site. According to the above-described configuration, in the case where the specific distribution ratio is greater than the predetermined ratio, the controller is configured to execute the intermittent operation using the second discharged hot-water target temperature. The second discharged hot-water target temperature is a temperature suitable for supplying water having the supplied hot-water target temperature to the hot water supply site in the case where the distribution ratio of the flow control mechanism is the predetermined ratio. This can accordingly suppress water having a temperature higher than the supplied hot-water target temperature from being supplied to the hot water supply site.

Embodiment

A water heater 2 according to the present embodiment will be described with reference to the drawings. As shown in FIG. 1, the water heater 2 comprises a housing 4, a combustion chamber 6, a water flow line 20, a gas supply line 40, and a controller 70. Power is supplied to the water heater 2 from a commercial power supply 90.

Configuration of Combustion Chamber 6

A gas burner 50 (an example of the "heating member") and a heat exchanger 60 are disposed in the combustion chamber 6. The gas burner 50 is arranged below the heat exchanger 60. A downstream end of the gas supply line 40 is connected to the gas burner 50. The gas burner 50 is configured to combust gas supplied from the gas supply line 40 and generate combustion gas. The gas burner 50 includes a first burner group 52a, a second burner group 52b, and a third burner group 52c.

The first burner group 52a, the second burner group 52b, and the third burner group 52c are respectively connected to a first branch pipe 42a, a second branch pipe 42b, and a third branch pipe 42c of the gas supply line 40, which will be described later. The gas is supplied from the branch pipes 42a to 42c to the burner groups 52a to 52c, respectively.

A fan 10 is disposed below the gas burner 50. The fan 10 is operated by the power supplied from the commercial power supply 90. The fan 10 is configured to supply air for combustion to the gas burner 50. The supply of air from the fan 10 to the gas burner 50 exhausts the combustion gas generated by the gas burner 50.

A flame rod 54 for detecting a flame of the gas burner 50 is disposed above the gas burner 50. An ignitor 56 and an electrode 58, both for igniting the gas burner 50 are respectively disposed lateral to and above the gas burner 50. In the gas burner 50, a high voltage that has been generated by the ignitor 56 is discharged using the electrode 58 to combust a mixture of the supplied gas and air, as a result of which the combustion gas is generated.

The heat exchanger 60 is disposed above the gas burner 50. The heat exchanger 60 is configured to heat water in the water flow line 20 with the combustion gas generated by the gas burner 50 combusting the gas. Water that has been heated in the heat exchanger 60 (high-temperature water (hot water)) is supplied to a hot water supply site.

An exhaust duct 8 for exhausting the combustion gas generated in the combustion chamber 6 is disposed above the heat exchanger 60.

Configuration of Water Flow Line 20

The water flow line 20 includes a water line 20a connecting a water supply source (e.g., a water supply) to an inlet 60a of the heat exchanger 60, a water heating line 20b passing through the heat exchanger 60, a hot water line 20c connecting an outlet 60b of the heat exchanger 60 to the hot water supply site (e.g., a shower or a faucet), and a bypass line 20d. The bypass line 20d connects the water line 20a to the hot water line 20c without going through the heat exchanger 60. When a hot water valve (not shown) at the hot water supply site is opened, water (hot water) is supplied to the hot water supply site.

A supplied water temperature sensor 22, a flow rate sensor 24, a water flow rate servo 26, and a bypass control valve 28 (an example of the "flow control mechanism") are arranged on the water line 20a in this order from its upstream side. The supplied water temperature sensor 22 is configured to detect a supplied water temperature Tin that is a temperature of water supplied from the water supply source to the water line 20a. The flow rate sensor 24 is configured to detect a supplied water flow rate WS that is a flow rate of water flowing in a part of the water line 20a upstream of the bypass control valve 28. The water flow rate servo 26 is configured to adjust the flow rate of water flowing in the water line 20a. The bypass control valve 28 is arranged at a connection 21a between the water line 20a and the bypass line 20d and is configured to adjust a ratio between a first flow rate W1 and a second flow rate W2. The first flow rate W1 is a flow rate of water passing through the water heating line 20b and supplied to the hot water line 20c, and the second flow rate W2 is a flow rate of water supplied to the hot water line 20c without passing through the water heating line 20b. A value obtained by dividing the second flow rate W2 by the first flow rate W1 will hereinafter be called a "bypass ratio Bp". In the present embodiment, a maximum bypass ratio Bp achievable by the bypass control valve 28 (which will hereinafter be called a "maximum bypass ratio Bpmax") is "3". The bypass control valve 28 may be arranged at any position as long as it is on the bypass line 20d. The bypass control valve 28 may be arranged, for example, at a connection 21b between the hot water line 20c and the bypass line 20d which will be described later.

A discharged hot-water temperature sensor 30 and a supplied hot-water temperature sensor 32 are arranged on the hot water line 20c. The discharged hot-water temperature sensor 30 is arranged upstream of the connection 21b between the hot water line 20c and the bypass line 20d, and the supplied hot-water temperature sensor 32 is arranged downstream of the connection 21b. The discharged hot-water temperature sensor 30 is configured to detect a discharged hot-water temperature Th that is a temperature of water that has passed through the heat exchanger 60. The supplied hot-water temperature sensor 32 is configured to detect a supplied hot-water temperature Tout that is a temperature of water which is a mixture of water supplied from the water heating line 20b and water supplied from the bypass line 20d.

Configuration of Gas Supply Line 40

An upstream end of the gas supply line 40 is connected to a gas supply source (e.g., a gas main tap). The gas is supplied to the gas supply line 40 from the gas supply source. The downstream end of the gas supply line 40 is connected to the gas burner 50 in the combustion chamber 6.

The gas supply line 40 is divided into three branches at a point and includes the first branch pipe 42a, the second branch pipe 42b, and the third branch pipe 42c. Downstream ends of the first branch pipe 42a, the second branch pipe 42b, and the third branch pipe 42c are respectively connected to the first burner group 52a, the second burner group 52b, and the third burner group 52c of the gas burner 50.

A main solenoid valve 44 and a proportional valve 46 are arranged on the gas supply line 40. The main solenoid valve 44 is configured to open and close the gas supply line 40. The main solenoid valve 44 in an opened state allows the gas to flow in the gas supply line 40, while the main solenoid valve 44 in a closed state does not allow the gas flow in the gas supply line 40. The proportional valve 46 is configured to adjust a flow rate of the gas flowing in the gas supply line 40. The flow rate of gas flowing in each of the first branch pipe 42a, the second branch pipe 42b, and the third branch pipe 42c divided from the gas supply line 40 is thereby adjusted.

A first switching solenoid valve 48a, a second switching solenoid valve 48b, and a third switching solenoid valve 48c are respectively arranged on the first branch pipe 42a, the second branch pipe 42b, and the third branch pipe 42c. The switching solenoid valves 48a to 48c are configured to open and close the branch pipes 42a to 42c, respectively. The switching solenoid valves 48a, 48b, 48c in an opened state allow the gas to flow in the branch pipes 42a, 42b, 42c, respectively, while the switching solenoid valves 48a, 48b, 48c in a closed state do not allow the gas flow in the branch pipes 42a, 42b, 42c, respectively.

Configuration of Controller 70

The controller 70 is disposed in the housing 4. The controller 70 includes, for example, a CPU and a memory. The controller 70 is configured to execute various types of control regarding the water heater 2.

A remote controller 80 is connected to the controller 70. The remote controller 80 is disposed for various settings regarding the water heater 2. For example, a supplied hot-water target temperature Tt can be set by using the remote controller 80. The supplied hot-water target temperature Tt is a temperature of water (hot water) supplied to the hot water supply site. The supplied hot-water target temperature Tt is set by a user.

Figure 2:
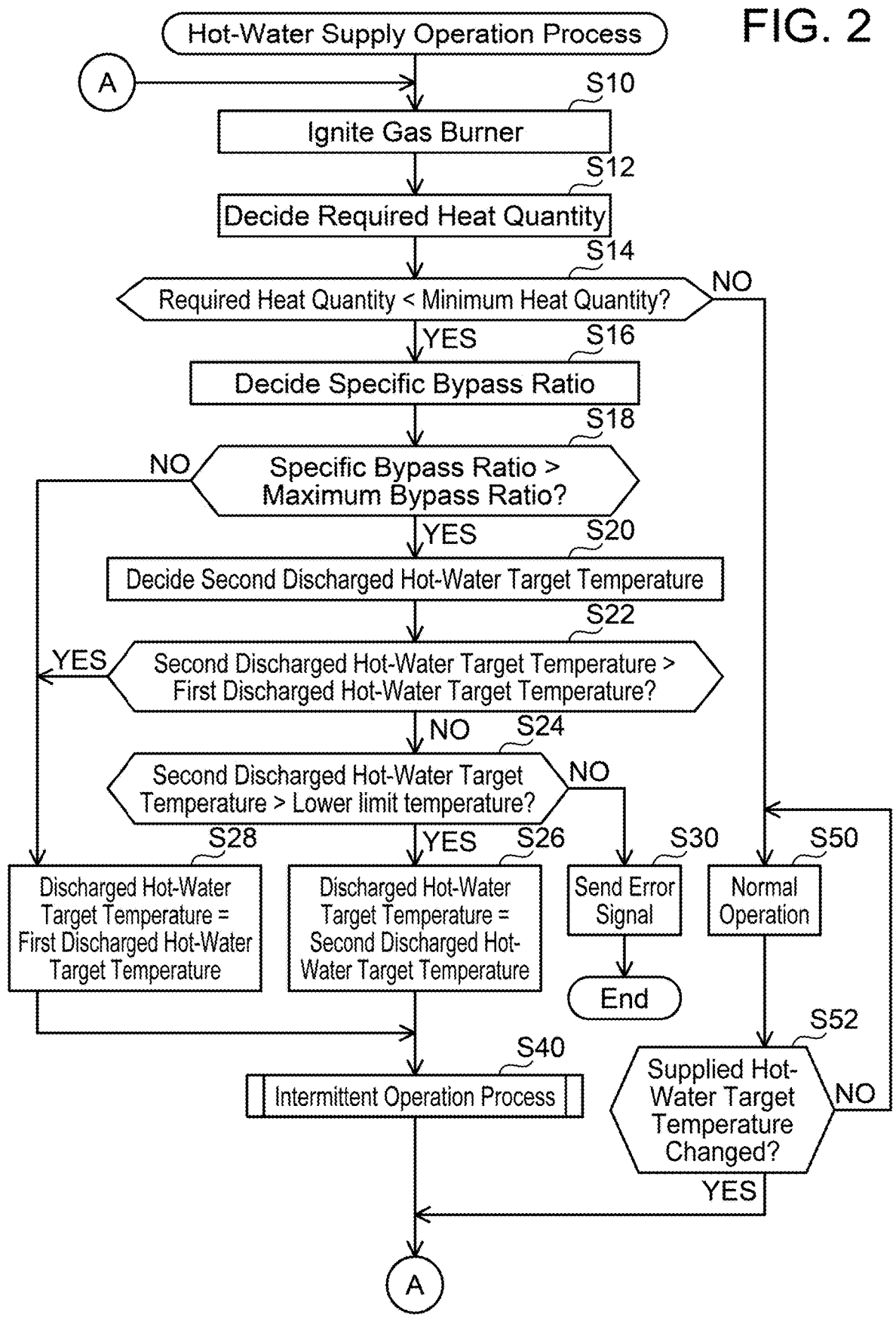
FIG. 2 is a diagram showing a flowchart of a hot-water supply operation process.

Hot-Water Supply Operation Process: FIG. 2

Next, a hot-water supply operation process executed by the controller 70 of the water heater 2 will be described. The hot-water supply operation process is a process for achieving a hot-water supply operation of supplying water heated to the supplied hot-water target temperature Tt to the hot water supply site. When the flow rate of water detected by the flow rate sensor 24 arranged on the water line 20a becomes greater than or equal to a predetermined flow rate, the controller 70 starts the process in FIG. 2.

At step S10, the controller 70 executes ignition of the gas burner 50. Firstly, the controller 70 operates the fan 10. When the fan 10 is operated, air for combustion is supplied from the fan 10 to the gas burner 50. Then, the controller 70 brings the main solenoid valve 44 arranged on the gas supply line 40 into the opened state, and brings a predetermined switching solenoid valve out of the switching solenoid valves 48a to 48c (e.g., the switching solenoid valve 48a) into the opened state. Then, the controller 70 causes the electrode 58 to discharge a high voltage that has been generated by the ignitor 50 to ignite the first burner group 52a.

At step S12, the controller 70 decides a required heat quantity Ht. The required heat quantity Ht is a heat quantity required to heat water flowing in the water flow line 20 to the supplied hot-water target temperature Tt. The controller 70 decides the required heat quantity Ht based on the supplied water temperature Tin, the supplied hot-water target temperature Tt, and the supplied water flow rate Ws. In a variant, the controller 70 may decide the required heat quantity Ht by further using a heating efficiency of the heat exchanger 60.

At step S14, the controller 70 determines whether or not the required heat quantity Ht decided at step S12 is less than a minimum heat quantity Hmin of the gas burner 50. In a case where the required heat quantity Ht is less than the minimum heat quantity Hmin, the controller 70 determines YES at step S14, and the process proceeds to step S16. On the other hand, in a case where the required heat quantity Ht is greater than or equal to the minimum heat quantity Hmin, the controller 70 determines NO at step S14, and the process proceeds to step S50.

At S16, the controller 70 decides a specific bypass ratio Bps by using a first discharged hot-water target temperature Tht1 (which is 60 [° C.] in the present embodiment), the supplied hot-water target temperature Tt, the supplied water temperature Tin, and the following equation. The first discharged hot-water target temperature Tht1 is a temperature that can prevent the supplied hot-water temperature Tout from excessively increasing after the gas burner 50 is switched from an ON state to an OFF state. The first discharged hot-water target temperature Tht1 is prestored in the memory of the controller 70.

$$Bp1=(Tht1-Tt)/(Tt-Tin)$$

At step S18, the controller 70 determines whether or not the specific bypass ratio Bps decided at step S16 is greater than the maximum bypass ratio Bpmax of the bypass control valve 28. In a case where the specific bypass ratio Bps is greater than the maximum bypass ratio Bpmax, the controller 70 determines YES at step S18, and the process proceeds to step S20. On the other hand, in a case where the specific bypass ratio Bps is less than or equal to the maximum bypass ratio Bpmax, the controller 70 determines NO at step S18, and the process proceeds to step S28.

At step S20, the controller 70 decides a second discharged hot-water target temperature Tht2 for use to operate the bypass control valve 28 at the maximum bypass ratio Bpmax, by using the supplied hot-water target temperature Tt and the supplied water temperature Tin. The controller 70 decides the second discharged hot-water target temperature Tht2 by using the following equation.

$$Tht2=(Tt-Tin)\times Bpmax+Tt$$

At step S22, the controller 70 determines whether or not the second discharged hot-water target temperature Tht2 decided at step S20 is higher than the first discharged hot-water target temperature Tht1 (60 [° C.]). In a case where the second discharged hot-water target temperature Tht2 is equal to or lower than the first discharged hot-water target temperature Tht1, the controller 70 determines NO at step S22, and the process proceeds to step S24. On the other hand, in a case where the second discharged hot-water target temperature Tht2 is higher than the first discharged hot-water target temperature Tht1, the controller 70 determines YES at step S22, and the process proceeds to step S28. At step S28, the controller 70 decides the first discharged hot-water target temperature Tht1 as a discharged hot-water target temperature Tht. The discharged hot-water target temperature Tht is a temperature used in an intermittent operation process described later.

At step S24, the controller 70 determines whether or not the second discharged hot-water target temperature Tht2 decided at step S20 is higher than a lower limit temperature T1 (which is 55 [° C.] in the present embodiment). The lower limit temperature T1 is a temperature that prevents occurrence of condensation in the water flow line 20 in the intermittent operation process. In a case where the second discharged hot-water target temperature Tht2 is higher than the lower limit temperature T1, the controller 70 determines YES at step S24, and the process proceeds to step S26. At step S26, the controller 70 decides the second discharged hot-water target temperature Tht2 as the discharged hot-water target temperature Tht.

On the other hand, in a case where the second discharged hot-water target temperature Tht2 is lower than or equal to the lower limit temperature T1, the controller 70 determines NO at step S24, and the process proceeds to step S30. At step S30, the controller 70 sends an error signal to the remote controller 80. The error signal is a signal indicating that the hot-water supply operation process has failed, and is also a signal prompting the user to raise the supplied hot-water target temperature Tt. When step S30 ends, the controller 70 terminates the process in FIG. 2. In a variant, step S30 may be omitted. In another variant, steps S24, S30 may be omitted.

At step S40, the controller 70 executes the intermittent operation process. The intermittent operation process is a process for executing an intermittent operation in which the gas burner 50 is alternately and repeatedly operated in the ON state and the OFF state. When the intermittent operation process ends, the process returns to step S10.

In the case of determining NO at step S14, the controller 70 executes a normal operation at step S50. The normal operation is an operation in which the gas burner 50 is continuously operated in the ON state. The controller 70 controls the operation of the gas burner 50 such that the heat quantity of the gas burner 50 becomes the required heat quantity Ht decided at step S12.

In the normal operation, the controller 70 controls the operation of the bypass control valve 28 in every process cycle such that the supplied hot-water temperature Tout becomes the supplied hot-water target temperature Tt. Firstly, the controller 70 decides a current bypass ratio Bpn. Then, the controller 70 decides a difference ΔR between the current bypass ratio Bpn and a reference bypass ratio Bps by using the supplied water temperature Tin, the supplied hot-water temperature Tout, the supplied hot-water target temperature Tt, and the following equation. The reference bypass ratio Bps is a bypass ratio Bp suitable for matching the supplied hot-water temperature Tout to the supplied hot-water target temperature Tt.

$$\Delta R=(1+R)\times(Tout-Tt)/(Tt-Tin)$$

Then, the controller 70 decides a target bypass ratio Bpt by using the following equation.

$$Bpt=(\Delta R\times G1)+Rn$$

The correction coefficient G1 is a coefficient for correcting ΔR, and is "0.75" in the present embodiment. The controller 70 then operates the bypass control valve 28 in the subsequent process cycle such that the target bypass ratio Bpt is achieved. This allows water having a temperature close to the supplied hot-water target temperature Tt to be supplied to the hot water supply site.

At step S52, the controller 70 determines whether or not the supplied hot-water target temperature Tt has been changed. In a case where the supplied hot-water target temperature Tt has been changed, the controller 70 determines YES at step S52, and the process returns to step S10. On the other hand, in a case where the supplied hot-water target temperature Tt is not changed, the controller 70 determines NO at step S52, and the process returns to step S50.

Figure 3:
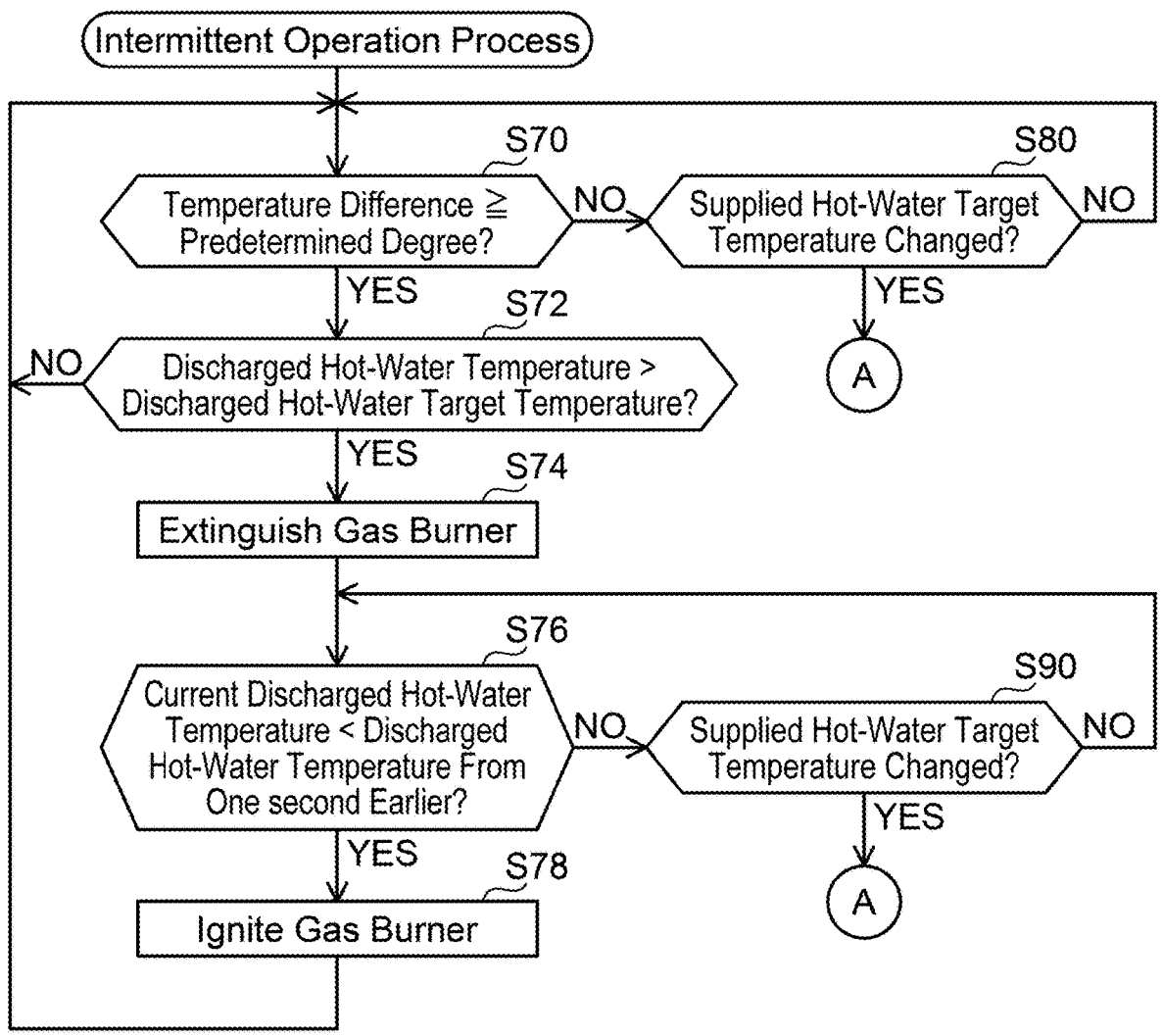
FIG. 3 is a diagram showing a flowchart of an intermittent operation process.

Intermittent Operation Process: FIG. 3

Next, the intermittent operation process executed at step S40 in FIG. 2 will be described. At step S70 in FIG. 3, the controller 70 determines whether or not a temperature difference Tod that is a difference between the supplied hot-water temperature Tout and the supplied hot-water target temperature Tt is greater than or equal to a predetermined degree (1 [° C.] in the present embodiment). In a case where the temperature difference Tod is greater than or equal to the predetermined degree, the controller 70 determines YES at step S70, and the process proceeds to step S72. On the other hand, in a case where the temperature difference Tod is less than the predetermined degree, the controller 70 determines NO at step S70, and the process proceeds to step S80. At step S80, the controller 70 determines whether or not the supplied hot-water target temperature Tt has been changed. In a case where the supplied hot-water target temperature Tt has been changed, the controller 70 determines YES at step S80, ends the process in FIG. 3, and returns to step S10 in FIG. 2. On the other hand, in a case where the supplied hot-water target temperature Tt is not changed, the controller 70 determines NO at step S80, and the process returns to step S70.

At step S72, the controller 70 determines whether or not the discharged hot-water temperature Th is higher than the discharged hot-water target temperature Tht decided at step S26 or S28 in FIG. 2. In a case where the discharged hot-water temperature Th is higher than the discharged hot-water target temperature Tht, the controller 70 determines YES at step S72, and the process proceeds to step S74. On the other hand, in a case where the discharged hot-water temperature Th is lower than or equal to the discharged hot-water target temperature Tht, the controller 70 determines NO at step S72, and the process returns to step S70.

At step S74, the controller 70 executes extinguishment of the gas burner 50. The controller 70 brings the main solenoid valve 44 arranged on the gas supply line 40 into the closed state, and brings the switching solenoid valve, out of the switching solenoid valves 48a to 48c, that is in the opened state into the closed state.

At step S76, the controller 70 determines whether or not a current discharged hot-water temperature Thn is lower than a discharged hot-water temperature Thn−1 which was detected one second earlier than the current discharged hot-water temperature. In a case where the current discharged hot-water temperature Thn is lower than the discharged hot-water temperature Thn−1 from one second earlier, the controller 70 determines YES at step S76, and the process proceeds to step S78. On the other hand, in a case where the current discharged hot-water temperature Thn is higher than or equal to the discharged hot-water temperature Thn−1 from one second earlier, the controller 70 determines NO at step S76, and the process proceeds to step S90. At step S90, the controller 70 determines whether or not the supplied hot-water target temperature Tt has been changed. In a case where the supplied hot-water target temperature Tt has been changed, the controller 70 determines YES at step S90, ends the process in FIG. 3, and returns to step S10 in FIG. 2. On the other hand, in a case where the supplied hot-water target temperature Tt is not changed, the controller 70 determines NO at step S90, and the process returns to step S76.

At step S78, the controller 70 executes ignition of the gas burner 50. When step S78 ends, the process returns to step S70.

While executing the intermittent operation process, the controller 70 controls an operation of the bypass control valve 28 in every process cycle such that the supplied hot-water temperature Tout becomes the supplied hot-water target temperature Tt. As in the case of the normal operation, the controller 70 decides the difference ΔR between the current bypass ratio Bpn and the reference bypass ratio Bps by using the supplied water temperature Tin, the supplied hot-water temperature Tout, the supplied hot-water target temperature Tt, and the following equation.

$$\Delta R = (1+R) \times (Tout - Tt)/(Tt - Tin)$$

Then, the controller 70 decides the target bypass ratio Bpt by using the following equation.

$$Bpt = (\Delta R \times G2) + Rn$$

The correction coefficient G2 is a coefficient for correcting ΔR, and is a value greater than the correction coefficient G1 which is used in the normal operation. The correction coefficient G2 is "1.2" in the present embodiment. The controller 70 then operates the bypass control valve 28 in the subsequent process cycle such that the target bypass ratio Bpt is achieved.

In a case where the hot water tap at the hot water supply site is closed during the processes in FIGS. 2 and 3 and the flow rate of water detected by the flow rate sensor 24 arranged on the water line 20a thereby becomes less than the predetermined flow rate, the controller 70 ends the processes in FIGS. 2 and 3.

As described above, in the case where the required heat quantity Ht is greater than or equal to the minimum heat quantity Hmin (NO at step S14 in FIG. 2), the controller 70 executes the normal operation in which the gas burner 50 is continuously operated in the ON state (step S50 in FIG. 2), while in the case where the required heat quantity Ht is less than the minimum heat quantity Hmin (YES at step S14 in FIG. 2), the controller 70 executes the intermittent operation in which the gas burner 50 is alternately and repeatedly operated in the ON state and the OFF state (step S40 in FIG. 2, and FIG. 3). Variations in heat quantity by the gas burner 50 in the intermittent operation are greater than variations in heat quantity by the gas burner 50 in the normal operation. Variations in the supplied hot-water temperature Tout in the intermittent operation are therefore greater than variations in the supplied hot-water temperature Tout in the normal operation. According to the above-described configuration, the operating speed of the bypass control valve 28 in the intermittent operation is faster than the operating speed of the bypass control valve 28 in the normal operation. In other words, the bypass ratio Bp is quickly changed in the intermittent operation. Therefore, even if the heat quantity greatly varies owing to the intermittent operation, the bypass ratio Bp can be changed quickly to quickly bring the supplied hot-water temperature Tout closer to the supplied hot-water target temperature Tt. Variations in the supplied hot-water temperature Tout in the intermittent operation can therefore be suppressed.

In the case where the required heat quantity Ht is less than the minimum heat quantity Hmin (YES at step S14 in FIG. 2), the controller 70 decides the specific bypass ratio Bps by using the first discharged hot-water target temperature Tht1, the supplied water temperature Tin, and the supplied hot-water target temperature Tt (step S16 in FIG. 2). The controller 70 then determines whether or not the specific bypass ratio Bps is greater than the maximum bypass ratio Bpmax (step S18 in FIG. 2). In the case where the specific bypass ratio Bps is less than or equal to the maximum bypass ratio Bpmax (NO at step S18 in FIG. 2), the controller 70 executes the intermittent operation using the discharged hot-water temperature Th and the first discharged hot-water target temperature Tht1 (steps S28, S40 in FIG. 2, and FIG. 3). In the case where the specific bypass ratio Bps is greater than the maximum bypass ratio Bpmax (YES at step S18 in FIG. 2), the controller 70 decides the second discharged hot-water target temperature Tht2 by using the supplied hot-water target temperature Tt, the supplied water temperature Tin, and the maximum bypass ratio Bpmax (step S20 in FIG. 2), and executes the intermittent operation using the discharged hot-water temperature Th and the second discharged hot-water target temperature Tht2 (steps S26, S40 in FIG. 2, and FIG. 3). The second discharged hot-water target temperature Tht2 is a temperature suitable for supplying water having the supplied hot-water target temperature Tt to the hot water supply site in the case where the bypass ratio Bp of the bypass control valve 28 is the maximum bypass ratio Bpmax. As such, water having a temperature higher than the supplied hot-water target temperature Tt can be prevented from being supplied to the hot water supply site.

Specific examples of the present disclosure have been described in detail, however, these are mere exemplary indications and thus do not limit the scope of the claims. The art described in the claims includes modifications and variations of the specific examples presented above.

The "heating member" is not limited to the gas burner 50, and may be a heating member that uses electricity, such as an electric heater.

Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A water heater comprising:
a heat exchanger;
a heating member configured to heat the heat exchanger;
a water line connecting a water supply site to an inlet of the heat exchanger;
a hot water line connecting an outlet of the heat exchanger to a hot water supply site;
a bypass line connecting the water line to the hot water line without going through the heat exchanger;
a supplied water temperature sensor arranged on the water line and configured to detect a supplied water temperature which is a temperature of water supplied to the water line;
a supplied hot-water temperature sensor arranged on the hot water line and configured to detect a supplied hot-water temperature which is a temperature of water supplied to the hot water supply site, the supplied hot-water temperature sensor being arranged downstream of a connection between the hot water line and the bypass line;
a flow control mechanism configured to adjust a distribution ratio which is a ratio of a second flow rate to a first flow rate, the first flow rate being a flow rate of water flowing from the water line to the heat exchanger, and the second flow rate being a flow rate of water flowing from the water line to the bypass line; and
a controller,
wherein the controller is configured to:
calculate a required heat quantity based on a supplied hot-water target temperature which is a target temperature of water supplied to the hot water supply site;
determine whether or not the required heat quantity is less than a minimum heat quantity of the heat exchanger;
in a case where the required heat quantity is greater than or equal to the minimum heat quantity, execute a normal operation in which the heating means is continuously operated in an ON state;
in a case where the required heat quantity is less than the minimum heat quantity, execute an intermittent operation in which the heating means is alternately and repeatedly operated in the ON state and an OFF state; and
change the distribution ratio of the flow control mechanism based on the supplied water temperature, the supplied hot-water temperature, and the supplied hot-water target temperature in the normal operation and in the intermittent operation,
wherein when changing the distribution ratio of the flow control mechanism, an operating speed of the flow control mechanism in the intermittent operation is greater than zero,
when changing the distribution ratio of the flow control mechanism, an operating speed of the flow control mechanism in the normal operation is greater than zero,
wherein the operating speed of the flow control mechanism in the intermittent operation is faster than the operating speed of the flow control mechanism in the normal operation.

2. The water heater as in claim 1, further comprising:
a discharged hot-water temperature sensor arranged on the hot water line and configured to detect a discharged hot-water temperature which is a temperature of water discharged to the hot water line from the heat exchanger, the discharged hot-water temperature sensor being arranged upstream of the connection between the hot water line and the bypass line,
wherein the flow control mechanism is operable within a range where the distribution ratio is less than or equal to a predetermined ratio,
wherein the controller is further configured to:
in the case where the required heat quantity is less than the minimum heat quantity, decide a specific distribution ratio using a predetermined first discharged hot-water target temperature, the supplied water temperature, and the supplied hot-water target temperature, the specific distribution ratio being a distribution ratio required for achieving the supplied hot-water target temperature;
determine whether or not the specific distribution ratio is greater than the predetermined ratio; and
in a case where the specific distribution ratio is less than or equal to the predetermined ratio, execute the intermittent operation using the discharged hot-water temperature and the first discharged hot-water target temperature, wherein in a case where the specific distribution ratio is greater than the predetermined ratio, a second discharged hot-water target temperature is decided by using the supplied water temperature, the supplied hot-water target temperature, and the predetermined ratio, and the intermittent operation using the discharged hot-water temperature and the second discharged hot-water target temperature is executed.

* * * * *